United States Patent
Loewen et al.

(10) Patent No.: US 9,767,931 B2
(45) Date of Patent: Sep. 19, 2017

(54) CHIMNEY STRUCTURE WITH INTERNAL PARTITIONS HAVING A COMMON CENTER, A REACTOR INCLUDING THE CHIMNEY STRUCTURE, AND A METHOD OF MANUFACTURING THE SAME

(71) Applicants: Eric P. Loewen, Wilmington, NC (US); Brett J. Dooies, Wilmington, NC (US)

(72) Inventors: Eric P. Loewen, Wilmington, NC (US); Brett J. Dooies, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 872 days.

(21) Appl. No.: 14/187,707

(22) Filed: Feb. 24, 2014

(65) Prior Publication Data

US 2017/0229197 A1    Aug. 10, 2017

(51) Int. Cl.
F23J 13/00 (2006.01)
G21C 15/26 (2006.01)
G21C 15/16 (2006.01)

(52) U.S. Cl.
CPC ............. G21C 15/26 (2013.01); G21C 15/16 (2013.01)

(58) Field of Classification Search
CPC ..................................................... F24B 7/005
USPC ........................................... 126/528; 431/199
See application file for complete search history.

(56) References Cited

U.S. PATENT DOCUMENTS

| | | | | |
|---|---|---|---|---|
| 1,938,251 A | | 12/1933 | Gibbs et al. | |
| 2,893,713 A | * | 7/1959 | Haltmeier | B01D 3/20 261/114.2 |
| 3,309,979 A | * | 3/1967 | Razak | F23L 17/08 454/33 |
| 3,872,780 A | * | 3/1975 | Zanias | E04H 12/28 126/307 R |
| 4,163,440 A | * | 8/1979 | Stultz | F24B 5/023 126/190 |
| 4,502,370 A | * | 3/1985 | Baileys | F16L 59/07 110/184 |

FOREIGN PATENT DOCUMENTS

GB    191108694 A    7/1911
JP    2007232546 A    9/2007

OTHER PUBLICATIONS

European Search Report and Opinion issued in connection with corresponding EP Application No. 15155796.4 on Jul. 22, 2015.
Hasanein, Hisham A. et al. "Steam-Water Two-Phase Flow in Large Diameter Vertical Piping at High Pressures and Temperatures", International Conference on Nuclear Engineering, vol. 1—Part B, 1996.

* cited by examiner

Primary Examiner — Avinash Savani
(74) Attorney, Agent, or Firm — Harness, Dickey & Pierce, P.L.C.

(57) ABSTRACT

A chimney structure according to a non-limiting example embodiment may include a guide structure defining an opening, and a plurality of chimney partitions including 1 to N chimney partitions concentrically arranged and spaced apart from each other on the guide structure. The 1 to N chimney partitions may each define a curved opening over the opening the guide structure. N may be an integer greater than 1.

22 Claims, 12 Drawing Sheets

Detail A

Section M-M

Detail B

Section L-L

Detail C

Section E-E

CHIMNEY STRUCTURE WITH INTERNAL PARTITIONS HAVING A COMMON CENTER, A REACTOR INCLUDING THE CHIMNEY STRUCTURE, AND A METHOD OF MANUFACTURING THE SAME

BACKGROUND

Field

The present disclosure relates to a chimney structure including internal partitions having a common center, a reactor including the chimney structure, and/or a method of manufacturing the chimney structure.

Description of Related Art

In a reactor, for example an Economic Simplified Boiling Water Reactor (ESBWR), a chimney structure may be arranged between the reactor core outlet and the steam separator inlet to establish, enhance, and deliver natural circulation of a fluid (e.g., a steam and water mixture) in the reactor vessel. A chimney structure may have internal partitions to ensure the steam water mixture flows in the vertical direction and/or to establish better natural circulation flow inside the reactor.

Many ESBWR reactors include a square-cell chimney structure having a round tube that surrounds a grid pattern of internal partitions. The internal partitions may define square cells and regions of small cross-section inside the round tube. For example, the square-cell chimney structure may be a round tube with square pegs as internal partitions inside the round tube.

In a square-cell chimney structure, portions of the internal partitions near the periphery (i.e., adjacent to the round tube surrounding the internal partitions) can define regions of small cross-section. Portions of the internal partitions that are not adjacent to the periphery can define the square cells. The steam water mixture flowing through the regions of small cross-section may have a higher pressure drop across the chimney structure than the steam water mixture flowing through the square cells. Consequently, during the operation of the reactor, the steam-water mixture flowing through the regions of small cross-section may be susceptible to undesirable flow regime changes.

Manufacturing the square-cell chimney structure may include numerous bending and welding steps to shape the internal partitions into a grid pattern and to join the internal partitions to the round tube. If the internal partitions have manufacturing defects, the numerous bends in the internal partitions may cause stress concentrations in the internal partitions. As a result, during the operation of a reactor including a square-cell chimney structure, the numerous welds and bends in the square-cell chimney structure have to be inspected frequently as part of periodic maintenance. The regions of small cross-section in the square-cell chimney structure may be more difficult to make and inspect during the operation of the reactor.

Additionally, placing the square-cell chimney structure in a reactor may include forming complex connections between the internal partitions of the square-cell chimney structure and a bottom or a top support piece. During a refueling operation, it may be necessary to remove the internal partitions of the square-cell chimney structure. Disconnecting the connections between the internal partitions of the square-cell chimney structure and a bottom or a top support piece may extend the reactor downtime during a refueling operation.

Accordingly, a chimney structure that reduces the regions of small cross-section defined by internal partitions, reduces the number of welds and bending steps in manufacturing the chimney structure, reduces the number of welds that are inspected during periodic maintenance, and/or has less pressure drop if a fluid (e.g., steam water mixture) flows through the chimney structure may be desired.

SUMMARY

Some example embodiments relate to a chimney structure including internal partitions having a common center.

Some example embodiments also relate to a reactor including a chimney structure with internal partitions having a common center.

Other example embodiments relate to a method of manufacturing a chimney structure including internal partitions having a common center.

According to an example embodiment, a chimney structure includes a guide structure defining an opening; and a plurality of chimney partitions including 1 to N chimney partitions concentrically arranged and spaced apart from each other on the guide structure. The 1 to N chimney partitions each define a curved opening over the opening of the guide structure, and N may be an integer greater than 1.

The 1 to N chimney partitions may each have a tubular shape, and the 1 to N chimney partitions may have different radii.

Each one of the 1 to N chimney partitions may be spaced apart from an adjacent one of the 1 to N chimney partitions by a same distance. A value of the same distance may be configured to reduce the formation of Eddy currents if a steam mixture flows through the 1 to N chimney partitions. A value of the same distance may be about 16 inches.

An upper surface of the guide structure may define M grooves spaced apart from each other, where M may be an integer greater than or equal to N. Parts of the 1 to N chimney partitions may be in the M grooves defined by the upper surface of the guide structure.

The chimney structure may further include a top plate on the 1 to N chimney partitions. The top plate may define an opening over the curved openings of the 1 to N chimney partitions.

The chimney structure may further include at least one rod secured to the guide structure.

The chimney structure may further include a plurality of divider plates extending through the 1 to N chimney partitions. The divider plates and the 1 to N chimney partitions may define a plurality of curved opening sections, based on sectionally dividing the curved openings of the 1 to N chimney partitions.

The chimney structure may further include a partition structure surrounding the 1 to N chimney partitions. An inner surface of the partition structure may define a round opening. The partition structure may include divider plates that divide the round opening into round opening sections. The 1 to N chimney partitions may each have a tubular shape, and the 1 to N chimney partitions may have different radii.

The divider plates may be metal sheets. The divider plates may include notches corresponding to the 1 to N chimney partitions, and the 1 to N chimney partitions may be in the notches of the divider plates.

The chimney structure may further include a plurality of slats between two adjacent chimney partitions among the 1 to N chimney partitions. The plurality of slats may be configured to divide a space between the two adjacent chimney partitions into smaller sections.

The plurality of slats may be attached to the inside surface of the outer chimney partition among the two adjacent chimney partitions. The plurality of slats may be configured to be positioned toward the inner chimney partition among the two adjacent chimney partitions in order to divide the space between the two adjacent chimney partitions into smaller sections, and the plurality of slats may be configured to be positioned against the inner surface of the outer chimney partition among the two adjacent chimney partitions in order to avoid dividing the space between the two adjacent chimney partitions into smaller sections.

The plurality of slats may be attached to the inner chimney partition among the two adjacent chimney partitions. The plurality of slats may be configured to be positioned toward the outer chimney partition among the two adjacent chimney partitions in order to divide the space between the two adjacent chimney partitions into smaller sections, and the plurality of slats may be configured to be positioned against the inner chimney partition among the two adjacent chimney partitions in order to avoid dividing the space between the two adjacent chimney partitions into smaller sections.

The 1 to N chimney partitions may each have a tubular shape, and each one of the 1 to N chimney partitions may be spaced part from an adjacent one of the 1 to N chimney partitions by a distance that is about equal to an inner diameter of the 1st chimney partition among the 1 to N chimney partitions.

The inner diameter of the 1st chimney partition may be about 16 inches. A diameter of the Nth chimney partition may be about 30 feet, and a height of the 1 to N chimney partitions may range from about 18 to 22 feet along the axial direction of the 1 to N chimney partitions. A value of N may be greater than or equal to 4 and less or equal to about 12.

The 1 to N chimney may partitions include 2nd to (N−1)th chimney partitions between the 1st and the Nth chimney partitions in sequential order. The 1 to N chimney partitions may each have a tubular shape. The 1 to N chimney partitions may have different radii. A separation distance between the 1st chimney partition and the 2nd chimney partition may be different than a separation distance between two adjacent chimney partitions among the 2nd to (N−1)th chimney partitions.

The 1 to N chimney partitions may include steel, and a thickness of the chimney partitions may range from about 0.25 inches to about 0.50 inches.

In an example embodiment, a reactor may include a reactor wall, and the above-described chimney structure may be secured to the reactor wall.

According to an example embodiment, a chimney structure may include a chimney housing defining an opening through an axial direction of the chimney housing; and a plurality of partitions including 1 to N partitions concentrically arranged in the opening of the chimney housing. The 1 to N partitions each define a curved opening along the axial direction of the chimney housing. The 1 to N partitions are spaced apart from each other and spaced apart from an inner surface of the chimney housing along the axial direction of the chimney housing. N may be an integer greater than 1.

According to an example embodiment, a method of manufacturing a chimney structure includes concentrically arranging a plurality of chimney partitions on a guide structure. The guide structure defines an opening. The plurality of chimney partitions include 1 to N chimney partitions concentrically arranged and spaced apart from each other on the guide structure. The 1 to N chimney partitions each define a curved opening over the opening of the guide structure. N is an integer greater than 1.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1A:
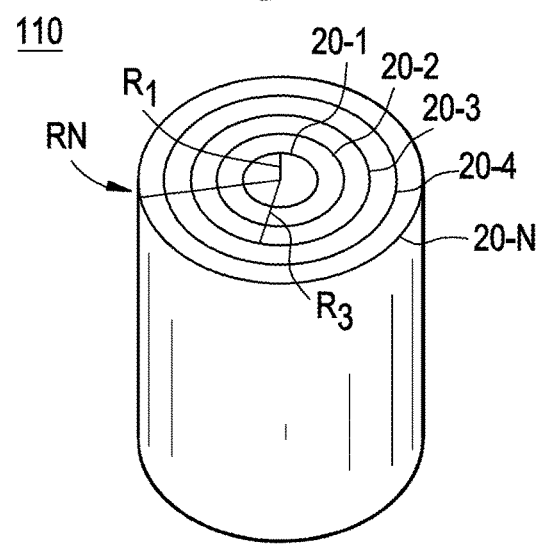
FIGS. 1A-1B are perspective views of a chimney structure according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, like reference numerals in the drawings denote like elements, and thus their description may be omitted.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1B:
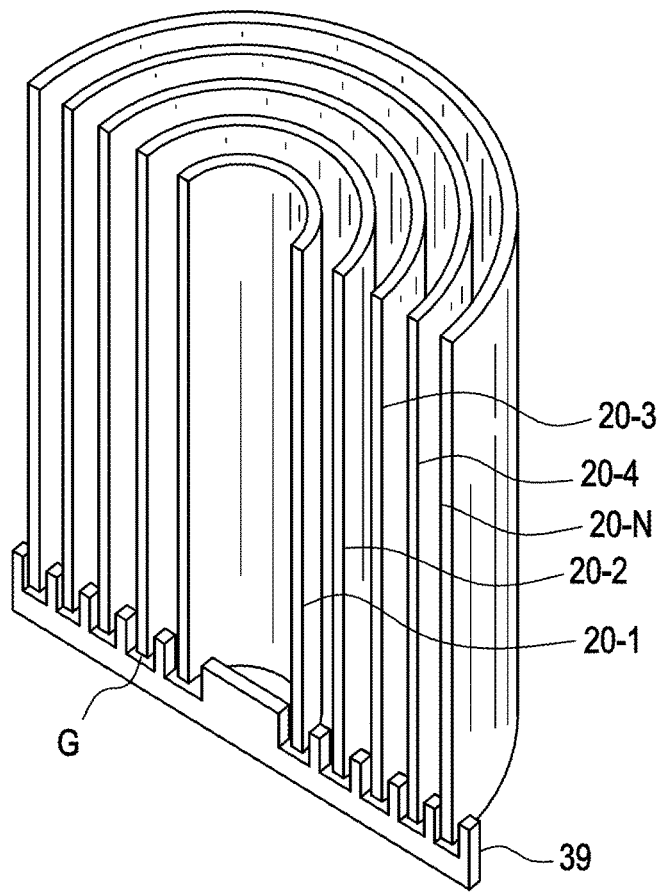
Figure 2:
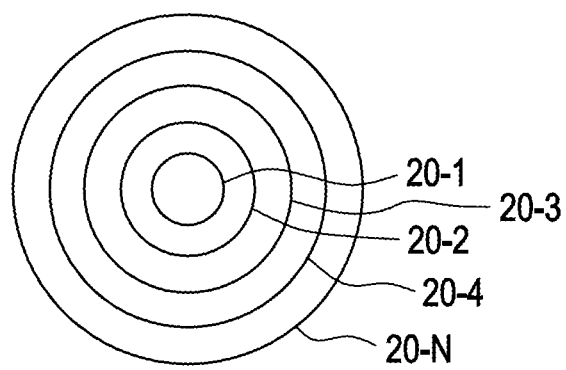
FIG. 2 is a plan view of the chimney structure illustrated in FIGS. 1A-1B.

FIGS. 1A-1B are perspective views of a chimney structure according to an example embodiment. FIG. 2 is a plan view of the chimney structure illustrated in FIGS. 1A-1B.

Referring to FIGS. 1A, 1B and 2, according to an example embodiment, a chimney structure 110 may include a plurality of chimney partitions 20-1 to 20-N having a common center. The chimney partitions 20-1 to 20-N may be positioned on a guide structure 39 with grooves G corresponding to the peripheries of the chimney partitions 20-1 to 20-N. Each one of the chimney partitions 20-1 to 20-N may define a curved opening that allows a fluid (e.g., a steam water mixture) to flow through the curved opening of the chimney partitions. The fluid may be a mixture that is 75 percent liquid water and 25 percent steam, but is not limited thereto. The guide structure 39 may also define a curved opening allowing fluid to flow through. When the chimney partitions 20-1 to 20-N are positioned in the grooves G of the guide structure 39, the curved openings of the chimney partitions 20-1 to 20-N may be arranged over the opening of the guide structure 39.

An upper surface of the guide structure 39 may define M grooves G and the grooves G may be spaced apart from each other. The value for M may be an integer than that is greater than or equal to N, and N may be an integer that corresponds to the number of chimney partitions 20-1 to 20-N. Parts of the chimney partitions 20-1 to 20-N may be in the M grooves defined by the upper surface of the guide structure 39. The upper surface of the guide structure 39 may define groves G in a circular pattern, as described in more detail with reference to FIG. 3G. However, FIG. 3H illustrates another example of the guide structure 39 where only the inner and outer grooves G have circular patterns and the grooves G in between do not have a circular pattern.

FIGS. 1A, 1B, and 2 illustrate an example where the chimney partitions 20-1 to 20-N each have a tubular shape with circular cross-sections and different radii (e.g., R1, R2, R3, RN).

When the chimney partitions 20-1 to 20-N have a circular cross-section, the pressure drop of a steam water mixture flowing through the chimney partitions with 20-1 to 20-N with a circular cross-sectional area is theoretically less than a steam water mixture flowing through partitions having an equivalent cross-sectional area but a square cell cross-section. Equations (1) and (2) below represent the area of square (As) and the perimeter of a square (Ps) may be expressed as a function of the length of each side (x) of the square. Equations (3) and (4) below represent how the area of a circle (Ac) and the perimeter of a circle (Pc) may be expressed as a function of the radius (r) of the circle.

$$As=x^2 \tag{1}$$

$$Ps=4*x \tag{2}$$

$$Ac=\pi*r^2 \tag{3}$$

$$Pc=2*\pi*r \tag{4}$$

Assuming the square cell and circular cell have equal cross-sectional areas, then the perimeter Ps of the square cell may be about 12% larger than a perimeter Pc of the circular cell. The hydraulic diameter of the chimney partitions 20-1 to 20-N with circular cross-sections may be about 13% larger than a square cell partition having the same cross-sectional area. As a result, assuming a square cell and a circular cell have the same cross-sectional area, the pressure drop of a steam mixture flowing through a chimney partition having a circular cross-section should be less than the pressure drop across a chimney partition having the same area with a square cell cross-sectional area. Because a chimney partition having a circular cross-section has a lower wetted surface than a chimney partition having a square cross-section with the same area, the pressure drop across the chimney partition having the circular cross-section theoretically should be lower than the pressure drop across the chimney partition having the square cross-section.

Although FIGS. 1A, 1B, and 2 illustrate an example embodiment where the chimney partitions have circular cross-sections, example embodiments are not limited thereto. For example, the chimney partitions 20-1 to 20-N may alternatively have elliptical cross-sections and/or polygonal cross-sections having a common center.

The chimney partitions 20-1 to 20-N may be formed of a metal and/or metal alloy. For example, the chimney partitions may be formed of steel such as SAE 304, or SAE 316 stainless steel. In some example embodiments, surfaces of the chimney partitions 20-1 to 20-N may be coated with at least one material capable of capturing nitrogen compounds containing N-16. The material capable of capturing nitrogen compounds containing N-16 may include at least one of a metallic compound having an acid center on a solid surface, a clay mineral (e.g., zeolite, sepiolite), hydroxyl apatite, carbon compounds such as activated carbon, metal carbides, and an ammonia decomposition catalyst supported by a metal (e.g., Pt, Ni, Ru, Mn).

A thickness of the chimney partitions 20-1 to 20-N may be about 0.25 to about 0.50 inches thick, but example embodiments are not limited thereto. The chimney partitions 20-1 to 20-N may all have the same thicknesses. Alternatively, some or all of the chimney partitions 20-1 to 20-N may have thicknesses that are different from each other.

In the chimney structure 110 illustrated in FIGS. 1A, 1B, and 2, each one of the chimney partitions 20-1 to 20-N may be spaced apart from an adjacent one of the chimney partitions 20-1 to 20-N by the same distance. When the chimney partitions 20-1 to 20-N are tubular in shape, each one of the chimney partitions 20-1 to 20-N may be spaced apart from an adjacent one of the chimney partitions 20-1 to 20-N by a distance that is about equal to an inner diameter of the first chimney partition 20-1 among the chimney partitions 20-1 to 20-N.

A value of the spacing between the chimney partitions 20-1 to 20-N may be configured to reduce the formation of Eddy currents if a fluid (e.g., steam water) mixture flows through the chimney partitions 20-1 to 20-N and/or direct the circulation of the fluid through the chimney structure 110. If the spacing between the chimney partitions is too small, then flow instabilities such as Eddy currents may result when a fluid flows between through the spaces between adjacent chimney partitions 20-1 to 20-N. On the other hand, if the spacing between adjacent chimney partitions 20-1 to 20-N is too large, then the chimney structure 110 may be less effective at ensuring the fluid flows in the vertical direction when the chimney structure 110 is installed in an operating reactor.

For example, if a steam water mixture flows through the chimney structure 110, the innermost chimney partition 20-1 may define an opening having an inner diameter of about 16 inches and the chimney partitions 20-2 to 20-N may be spaced apart from adjacent chimney partitions by about 16 inches. In other words, an inner surface of the chimney partition 20-2 may be spaced apart from an outer surface of the chimney partition 20-1 by about 16 inches, and inner surface of the chimney partition 20-3 may be spaced apart from an outer surface of the chimney partition 20-2 by about 16 inches. However, depending on the fluid intended to flow through the chimney structure 110 and/or depending on the application, the spacing between the chimney partitions 20-1 to 20-N may be a value that is different than 16 inches.

Although the chimney partitions 20-1 to 20-N in the chimney structure 110 illustrated in FIGS. 1A, 1B, and 2 may be spaced apart from each other by the same distance, example embodiments are not limited thereto. In some example embodiments, at least some of the chimney partitions 20-1 to 20-N may be spaced apart from each other by different distances. For example, in some applications, the flow of the steam water mixture may be different through the central chimney partitions 20-1, 20-2 compared to the outer chimney partitions 20-3 to 20-N of the chimney structure 110. Accordingly, the inner chimney partitions 20-1 to 20-2 may be spaced apart from each other by a first distance, and the outer chimney partitions 20-3 to 20-N may be spaced apart from each other by a second distance that is different than the first distance. The second distance by less than or greater than the first distance.

In one example embodiment, a height L of the chimney partitions may be about 20 feet plus or minus 2 feet along the axial direction of the chimney partitions, and an outer diameter of the outermost chimney partition 20-N may be about 30 feet. Even though FIGS. 1A, 1B, and 2 illustrate an example embodiment where the chimney structure 110 includes 5 chimney partitions 20-1 to 20-N, example embodiments are not limited thereto. For example, the number of chimney partitions 20-1 to 20-N may be an integer greater than or equal to 4 and less than or equal to 12 (or about 12). However, number of chimney partitions 20-1 to 20-N may vary depending on the application is not limited thereto.

The outermost chimney partition 20-N of the chimney structure 110 may be a chimney housing that defines an opening through an axial direction of the chimney housing. A plurality of chimney partitions 20-1 to 20-4 may arranged to have a common center (e.g., concentrically arranged) within the outermost chimney partition 20-N as the chimney housing. The chimney partitions 20-1 to 20-4 may each define a curved opening along the axial direction of the chimney partition 20-N. The chimney partitions may be spaced part from each other and spaced apart from an inner surface of the chimney partition along the axial direction of the housing.

FIGS. 3A to 3D illustrate a method of manufacturing a chimney structure including square cell partitions.

Figure 3A:
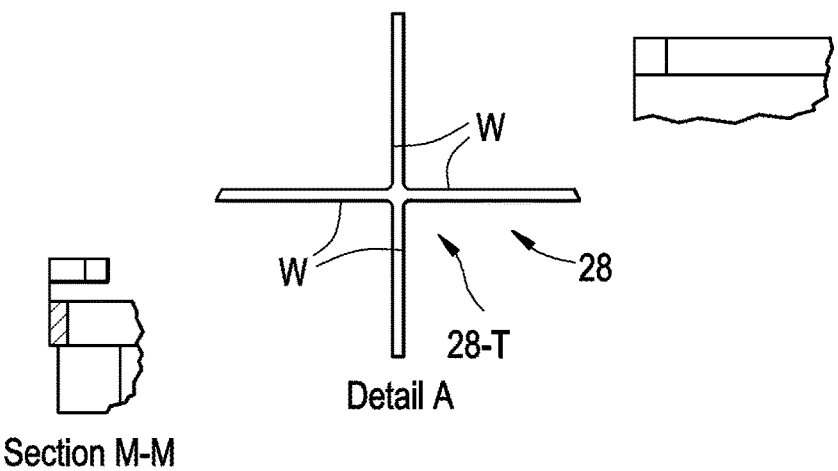
FIGS. 3A to 3D illustrate a method of manufacturing a chimney structure including square cell partitions.

Referring to FIG. 3A, a method of manufacturing a square-cell for use in a chimney structure including square cell partitions may include welding a T-shaped part 28-T to metal sheets 28. The reference character W in FIG. 3A illustrates the welds W.

Figure 3B:
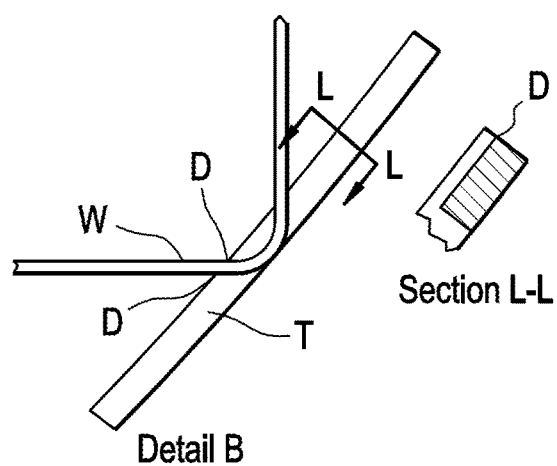

As shown in FIG. 3B, bent portions 28-B of the metal sheets 28 may be welded to the tube T surrounding the internal partitions of a chimney structure including square cell partitions. If there are metal defects D in the bent portions 28-B, then stress concentrations in the bent portions 28-B may result. During the operation of a reactor including a square-cell chimney structure, the numerous welds W and bends in the square-cell chimney structure have to be inspected as part of periodic maintenance.

Figure 3C:
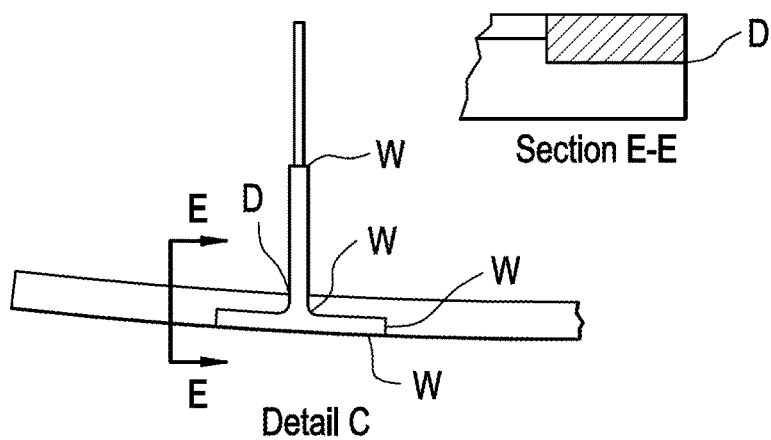

As shown in FIG. 3C, joining the square cell partitions to the top or bottom of a circular support piece may require complex connections.

Figure 3D:
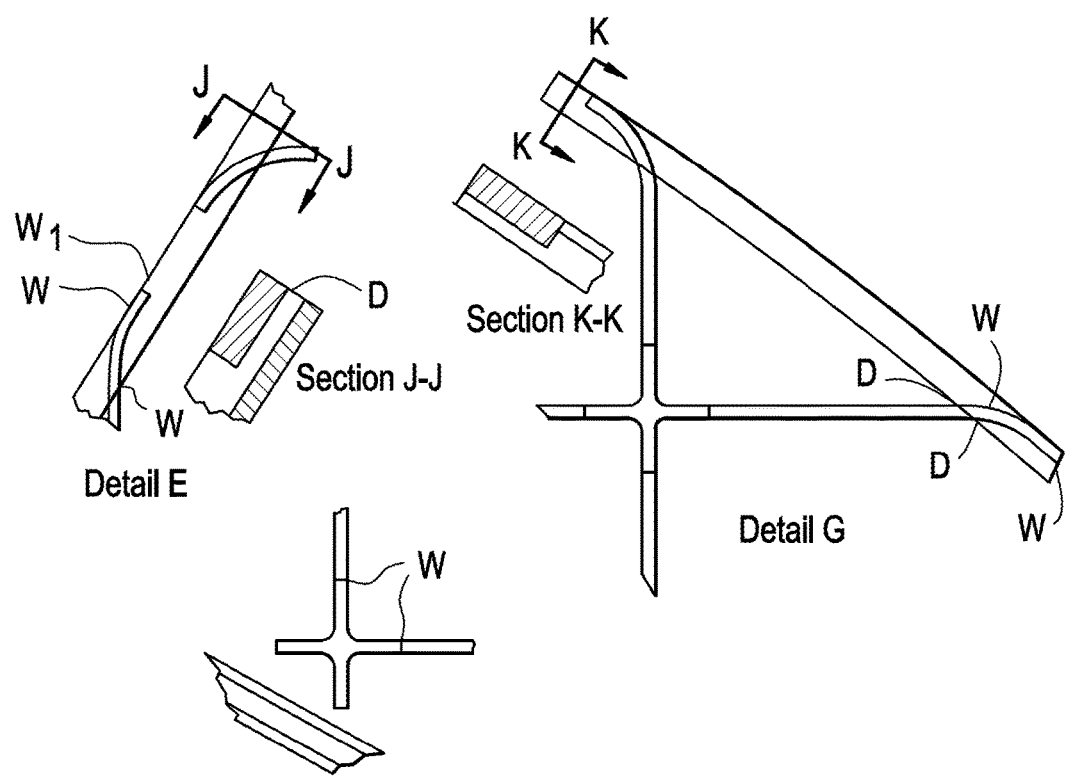

Lastly, as shown in FIG. 3D, there are numerous bends and welds in the regions of small cross section near the edge of the square-cell chimney structure that are difficult to make and inspect during the life of the component.

According to an example embodiment, a method of manufacturing a chimney structure may include concentrically arranging a plurality of chimney partitions on a guide structure. The guide structure may define an opening. The plurality of chimney partitions may include 1 to N chimney partitions concentrically arranged and spaced part from each other on the guide structure. The 1 to N chimney partitions may each define a curved opening over the opening of the guide structure. The number of chimney partitions N may an integer greater than 1. The number of chimney partitions N may be an integer from 4 to 12 (or about 12), but is not limited thereto.

In an example embodiment, a method may include concentrically arranging a plurality of chimney partitions that are tubular structures with circular cross-sections. The chimney partitions may be spaced apart from each other by the same distance. Alternatively, some or all of the chimney partitions may be spaced apart from each other by difference distances.

Although the chimney partitions may be tubular structures with circular cross-sections, example embodiments are not limited thereto. The chimney partitions alternatively may have elliptical and/or polygonal (e.g., square, rectangular, octagonal) cross-sections. In such as a case, the chimney partitions may be arranged to have a common center.

Figure 3E:
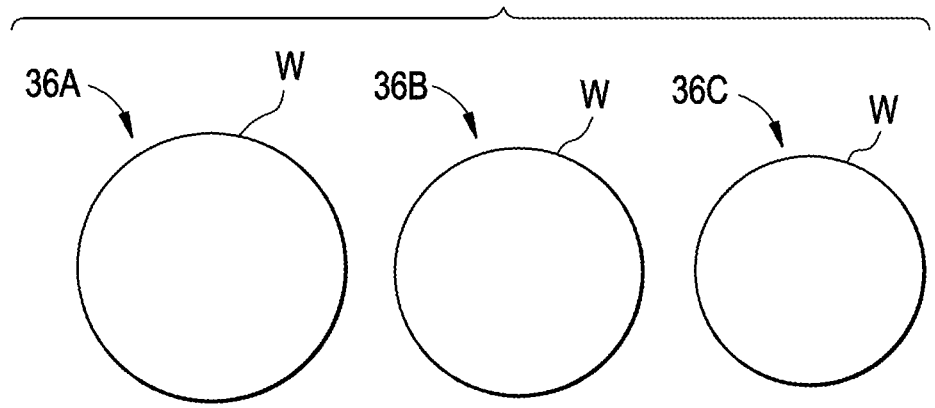
FIGS. 3E to 3F illustrate a method of manufacturing a chimney structure according to an example embodiment.
Figure 3F:
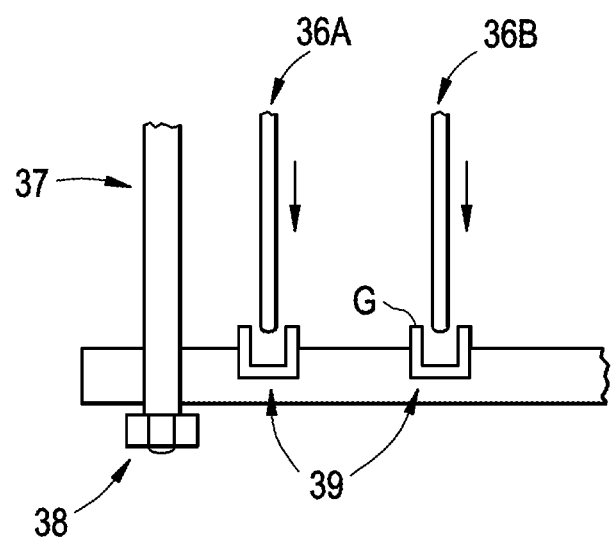

FIGS. 3E to 3F illustrate a method of manufacturing a chimney structure according to an example embodiment.

Referring to FIG. 3E, fabricating round tube chimney partitions 36A to 36C may include bending and/or rolling flat metallic sheets (or sheets formed from a metal alloy) into tubular structures with one vertical weld W. The vertical welds W of the round tube chimney partitions 36A to 36C are in an orientation that may be optimal for inspection in future operation.

Referring to FIG. 3F, the round tube chimney partitions 36A to 36C may be placed in the grooves G of a guide structure 39. The chimney partitions 36A to 36C may be held in place under compression between the guide structure 39 and a top plate (refer to reference character 40 in FIG. 4A) using at least one threaded rod 37 and nut 38 secured to the guide structure 39 and top plate. This simple assembly technique allows for ease of maintenance and inspections. Further, when a chimney structure according to an example embodiment is utilized in an ESBWR reactor, the simple assembly technique may allow for ease of future decommissioning. Instead of using a rod 37 and nut 38, the rod 37 may be clamped to the guide structure 39 and top plate.

Even though FIGS. 3E to 3F illustrate an example where the chimney partitions are tubular in shape, example embodiments are not limited thereto and the shape of the chimney partitions 36A to 36C may alternatively have an elliptical and/or a polygonal cross-section. The chimney partitions 36A to 36C may be formed of steel such as SAE 304, or SAE 316 stainless steel. A thickness of the chimney partitions 36A to 36C may be in the range from 0.25 to 0.50 inches, but example embodiments are not limited thereto. A height of the chimney partitions 36A to 36C may be about 20 feet plus or minus 2 feet along the axial direction of the chimney partitions, and an outer diameter of the outermost chimney partition 36C may be about 30 feet, but example embodiments are not limited thereto.

Even though FIGS. 3E to 3F illustrate an example embodiment where the chimney structure includes 3 chimney partitions 36A to 36C, example embodiments are not limited thereto. For example, the number of chimney partitions 36A to 36C may be an integer greater than or equal to 4 and less than or equal to 12. The number of chimney partitions 36A to 36C may be an integer greater than or equal to 4 and less than or equal to 12 (or about 12). However, number of chimney partitions 36A to 36C may vary depending on the application is not limited thereto.

Figure 3G:
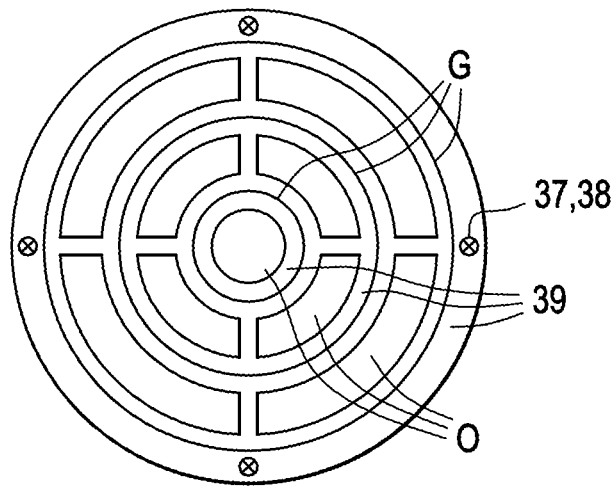
FIG. 3G is a plan view of a grooved plate in a chimney structure according to an example embodiment.
Figure 3H:
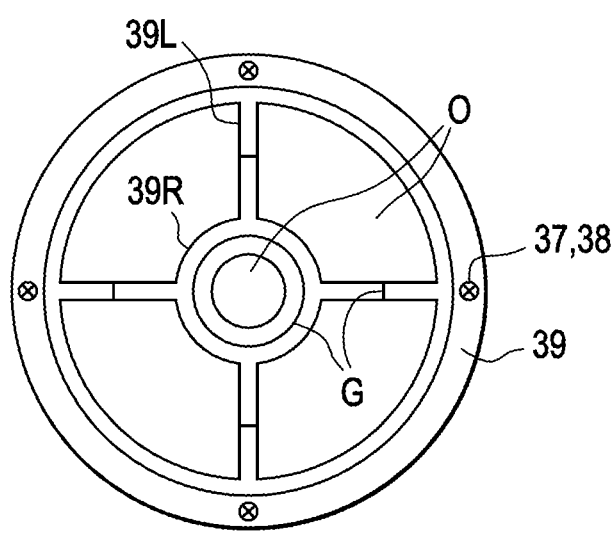
FIG. 3H is a plan view of a grooved plate in a chimney structure according to an example embodiment.

FIG. 3G is a plan view of a grooved plate in a chimney structure according to an example embodiment.

Referring to FIG. 3G, according to an example embodiment, a guide structure 39 may have a round periphery. On the round periphery, threaded holes may be defined so at least one threaded rod 37 and corresponding nut 38 may be secured to the guide structure 39.

An upper surface of the guide structure 39 may define grooves G corresponding to where the round tube chimney partitions 36A to 36C described previously may be concentrically arranged on the guide structure 39.

An upper surface of the guide structure 39 may define M grooves G spaced apart from each other. Additionally, M may be an integer that is greater than or equal to the number of chimney partitions 36A to 36C. Parts of the chimney partitions 36A to 36C may be in the M grooves defined by the upper surface of the guide structure 39.

FIG. 3G illustrates an example where the grooves G defined by the guide structure 39 are all circular in shape, but example embodiments are not limited thereto. For example, if the shape of the chimney partitions 36A to 36C concentrically arranged on the guide structure 39 have an elliptical and/or polygonal cross-section, then the shape of the grooves G defined by the guide structure 39 may be modified to have a corresponding elliptical and/or polygonal cross-section.

Additionally, FIG. 3H is a plan view of a grooved plate in a chimney structure according to an example embodiment. In FIG. 3H, only the innermost groove G and the outermost groove G have a circular shape. The middle groove G of the guide structure 39 is not circular. The middle groove G of the guide structure 39 is defined in four locations by connecting portions 39C of the guide structure that connect an inner ring portion 39R of the guide structure to an edge of the guide structure 39. As a result, the openings O between the ring portion 39R of the guide structure 39 and the edge of the guide structure 39 may be larger compared to the openings in the guide structure shown in FIG. 3G.

Figure 4A:
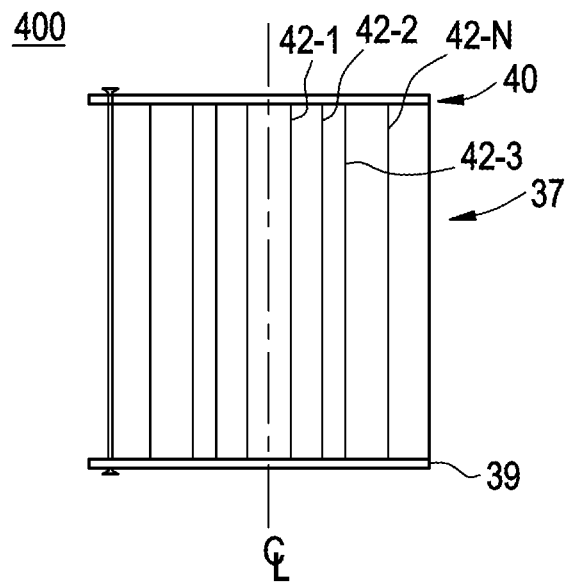
FIGS. 4A and 4B are a sectional view and a plan view of a chimney structure according to an example embodiment.
Figure 4B:
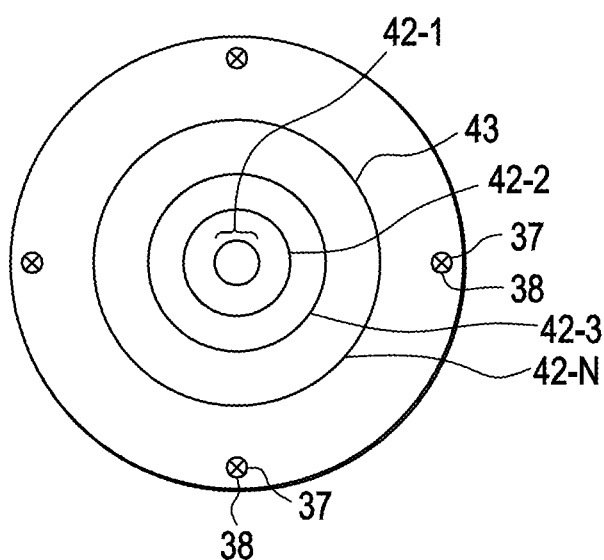

FIGS. 4A and 4B are a sectional view and a plan view of a chimney structure according to an example embodiment.

Referring to FIGS. 4A and 4B, according to an example embodiment, a chimney structure 400 may include a guide structure 39 and a top plate 40. A number of chimney partitions 42-1 to 42-N may be held in place under compression between the guide structure 39 and the top plate 40. One or more threaded rod and nut 38 may be used to secure the guide structure 39 to the top plate 40. The top plate 40 may define an opening over openings defined by the chimney partitions 42-1 to 42-N. Parts of the chimney partitions may be inserted in grooves defined by an upper surface of the guide structure 39 and/or a lower surface of the top plate. In FIGS. 4A and 4B, reference number 42-1 illustrates an inner most one of the chimney partitions and reference number 42-N illustrates an outer most one of the chimney partitions. FIGS. 4A and 4B also illustrate two rings 42-2 and 42-3 corresponding to chimney partitions between the chimney partitions 42-1 and 42-N.

In an ESBWR reactor the flow of the steam water mixture flow may be greater in the center of the reactor than edges of the reactor, due to differences in the heat generated in the reactor core. Accordingly, depending on the application, it may be practical to adjust the spacing between the chimney partitions 42-1 to 42-N so some of the chimney partitions are spaced apart from each other by different distances. A configuration where some chimney partitions 42-1 to 42-N are spaced apart from each other by greater distances compared to other chimney partitions 42-1 to 42-N can reduce manufacturing costs by lowering the number of chimney partitions 42-1 to 42-N in the chimney structure 400.

For example, in FIGS. 4A and 4B, a separation distance between the chimney partitions 42-1 and 42-2 may be different than a separation distance between the chimney partitions 42-3 and 42-N. A separation distance between the chimney partitions 42-2 and 42-3 may be less than a separation distance between the chimney partition 42-3 and 42-N.

The chimney partitions 42-1 to 42-N may be formed of a metal and/or metal alloy. For example, the chimney partitions may be formed of steel such as SAE 304, or SAE 316 stainless steel. In some example embodiments, surfaces of the chimney partitions 42-1 to 42-N may be coated with at least one material capable of capturing nitrogen compounds containing N-16. The material capable of capturing nitrogen compounds containing N-16 may include at least one of a metallic compound having an acid center on a solid surface, a clay mineral (e.g., zeolite, sepiolite), hydroxyl apatite, carbon compounds such as activated carbon, metal carbides, and an ammonia decomposition catalyst supported by a metal (e.g., Pt, Ni, Ru, Mn).

A thickness of the chimney partitions 42-1 to 42-N may be about 0.25 to about 0.50 inches thick, but example embodiments are not limited thereto. The chimney partitions 42-1 to 42-N may all have the same thicknesses. Alternatively, some or all of the chimney partitions 42-1 to 42-N may have thicknesses that are different from each other.

The chimney partitions 42-1 to 42-N may each have tubular shape with different radii and a common center. A separation distance between the innermost chimney partition 42-1 and an adjacent chimney partition 42-2 may be different than a separation distance between two adjacent chimney partitions among the chimney partitions 42-1 to 42-N. Although the chimney partitions 42-1 to 42-N are illustrated as having a tubular shape with a circular cross-section, example embodiments are not limited thereto. The chimney partitions 42-1 to 42-N may alternatively have an elliptical or polygonal cross-section.

A height of the chimney partitions 42-1 to 42-N may be about 20 feet plus or minus 2 feet along the axial direction of the chimney partitions, and an outer diameter of the outermost chimney partition 20-N may be about 30 feet.

Although FIGS. 4A and 4B illustrate a chimney structure including four chimney partitions 42-1 to 42-N having a common center, example embodiments are not limited thereto. The chimney partitions 42-1 to 42-N may include 2nd to (N−1)th concentrically arranged between the chimney partitions 42-1 and 42-N in sequential order. For example, the number of chimney partitions 42-1 to 42-N may be an integer greater than or equal to 4 and less than or equal to 12. The number of chimney partitions 42-1 to 42-N may be an integer greater than or equal to 4 and less than or equal to 12 (or about 12). However, number of chimney partitions 42-1 to 42-N may vary depending on the application is not limited thereto. Additionally, the chimney partitions 42-1 to 42-N may have a tubular shape with circular cross-sectional shapes and different radii. Alternatively, the chimney partitions 42-1 to 42-N may have elliptical or polygonal cross-sections instead of circular cross-sections.

Figure 5A:
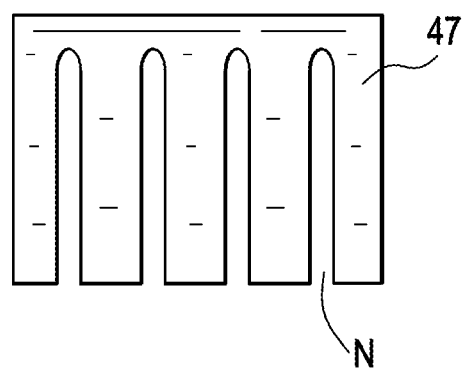
FIGS. 5A and 5B illustrate a chimney structure according to an example embodiment.
Figure 5A:
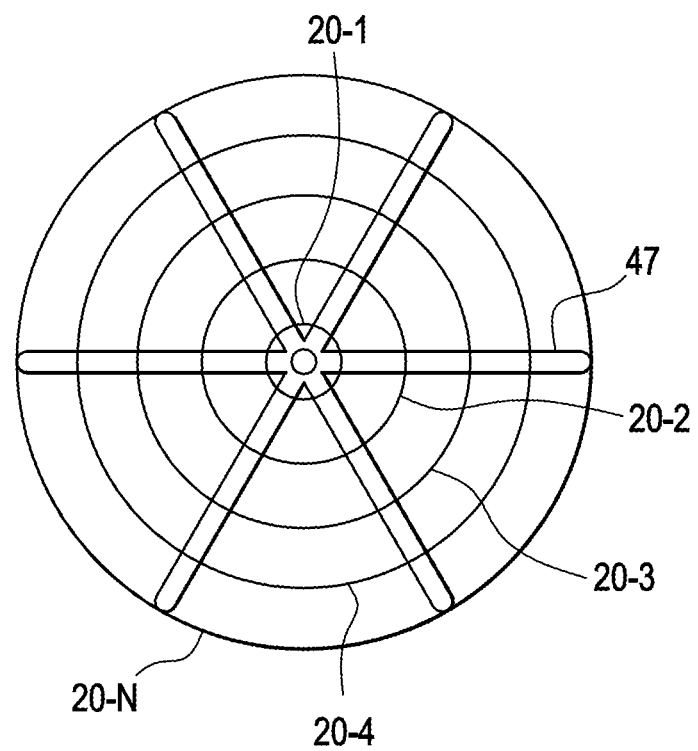
Figure 5B:
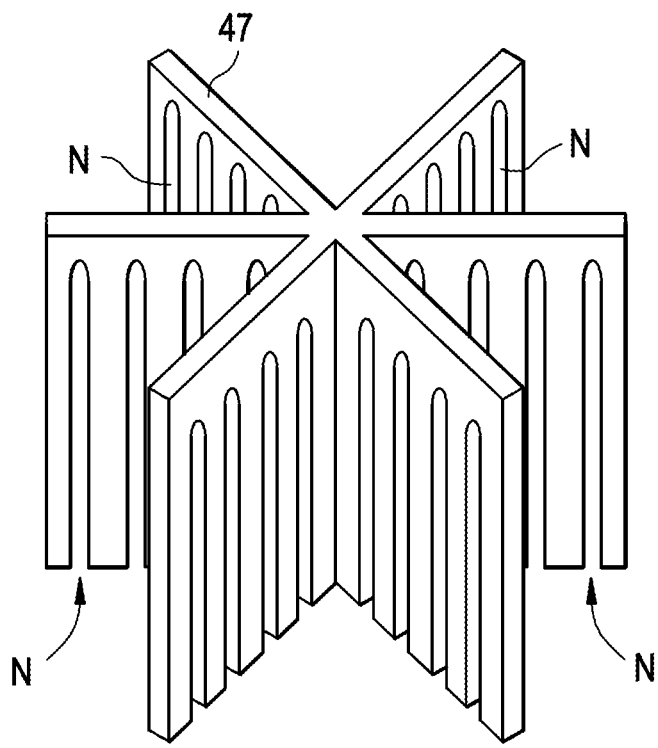
Figure 5B:
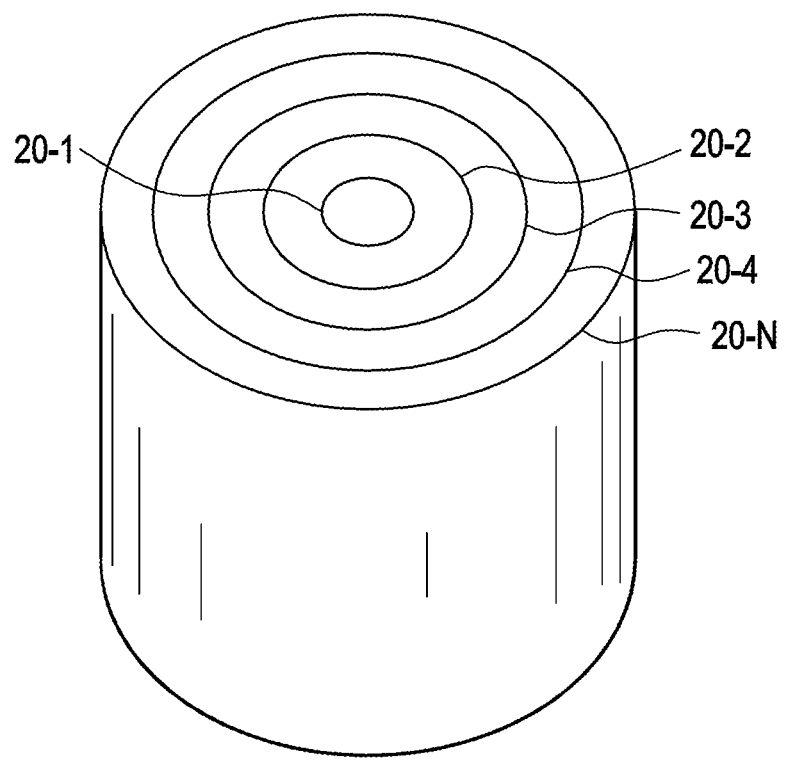

FIGS. 5A and 5B illustrate a chimney structure according to an example embodiment.

Referring to FIGS. 5A and 5B, according to example embodiments, a chimney structure 500 may be the same as the chimney structure 110 described previously with regard to FIGS. 1A, 1B, and 2, except the chimney structure 500 may further include a partition structure 46 that includes a plurality of divider plates 47. The divider plates 47 of the partition structure 46 may define notches N that are spaced apart from each other. The number of notches N defined by the divider plates 47 may be equal to the number of chimney partitions 20-1 to 20-N in the chimney structure 500, and the number of notches N in the divider plates 47 may be spaced apart from each other at intervals equal to the spacing of the chimney partitions 20-1 to 20-N. The partition structure 46 may be placed on the chimney structure 500 so the notches N of the divider plates 47 fit over the chimney partitions 20-1 to 20-N. The divider plates 47 may extend through the chimney partitions 20-1 to 20-N. In other words, the chimney partitions 20-1 to 20-N may fit in the notches N of the divider plates 47. The divider plates 47 and the chimney partitions 20-1 to 20-N may define a plurality of curved opening sections, based on sectionally dividing the curved openings of the chimney partitions 20-1 to 20-N.

The divider plates 47 may be metal sheets including notches that correspond to the chimney partitions 20-1 to 20-N. For example, the divider plates 47 may be made from SAE 304 or SAE 316 stainless steel.

Although not illustrated, the partition structure may include a round housing surrounding the chimney partitions 20-1 to 20-N. An inner surface of the partition structure may define a round opening. The divider plates 47 of the partition structure 46 may divide the round opening into round opening sections. When the partition structure with a round housing is placed on the chimney structure 500, the divider plates 47 of the partition structure may sectionally divide the curved openings of the chimney partitions 20-1 to 20-N.

Although FIGS. 5A and 5B illustrate an example where the partition structure 46 is constructed to fit over a chimney structure 500 including chimney partitions 20-1 to 20-N each having a tubular shape with circular cross-sections and different radii, one of ordinary skill in the art would understand various modifications in form may be made. For example, if the number of chimney partitions 20-1 to 20-N in the chimney structure is different than four, then the number of notches in the divider plates 47 may be adjusted to correspond to the number of chimney partitions 20-1 to 20-N. As another example, the partition structure 46 may be rotated 180 degrees and arranged so the chimney partitions 20-1 to 20-N are placed on the rotated partition structure 46. In other words, the divider plates 47 of the partition structure 46 may extend vertically from a bottom of the chimney partitions 20-1 to 20-N towards a top of the chimney partitions 20-1 to 20-N. Alternatively, if the chimney partitions 20-1 to 20-N have elliptical and/or polygonal cross-sections, then the notches N and orientation of the divider plates 47 may be adjusted to correspond to peripheries of chimney partitions having non-circular cross-sectional shapes.

Figure 5C:
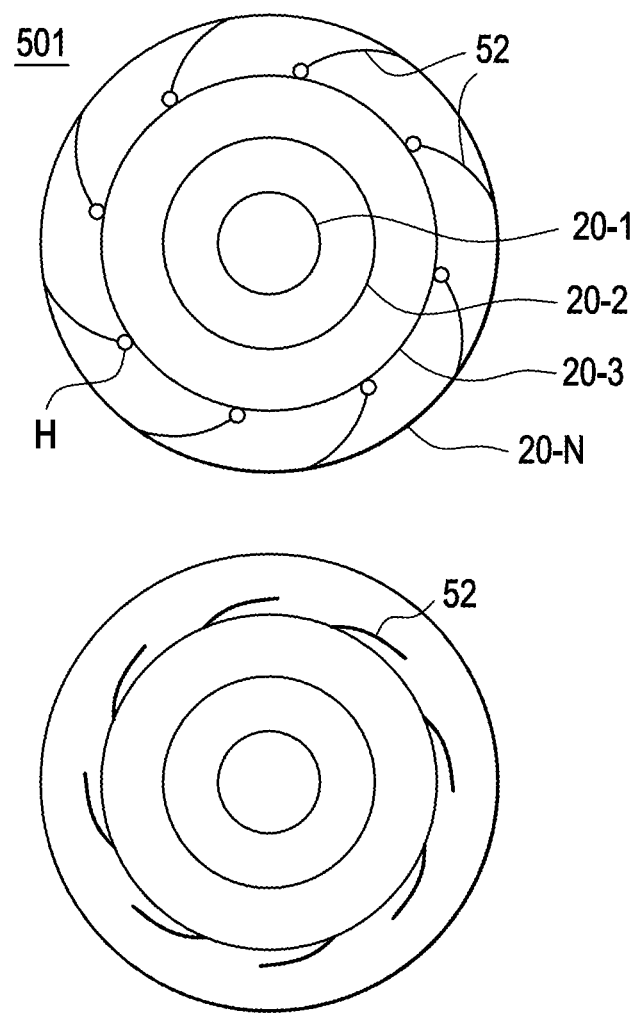
FIG. 5C illustrates a chimney structure according to an example embodiment.

FIG. 5C illustrates a chimney structure according to an example embodiment.

Referring to FIG. 5C, according to an example embodiment, a chimney structure 501 may be the same as the chimney structure 110 described previously with regard to FIGS. 1A, 1B, and 2, except the chimney structure 500 may further include a plurality of slats 52 between two adjacent chimney partitions among the chimney partitions 20-1 to 20-N. The plurality of slates 52 may be configured to divide a space between two adjacent chimney sections into smaller sections.

The plurality of slats 52 may be attached to the inner chimney partition among the two adjacent chimney partitions. The plurality of slats 52 may be attached to the inner chimney partition using a hinge structure H. Because of the hinge structure H, the plurality of slats 52 may be configured to be positioned toward the outer chimney partition among the two adjacent chimney partitions in order to divide the space between the two adjacent chimney partitions into smaller sections, and the plurality of slats 52 may be configured to be positioned against the inner chimney partition among the two adjacent chimney partitions in order to avoid dividing the space between the two adjacent chimney partitions into smaller sections.

For example, FIG. 5C illustrates an example where the plurality of slats 52 are attached to the outer surface of the chimney partition 20-3 with hinge structures H. The plurality of slats 52 may be adjusted open to extend towards the chimney partition 20-N. The plurality of slats may also be adjusted closed to be positioned against the outer surface of the chimney partition 20-3. When the chimney structure 501 is placed in an ESBWR reactor, positioning the plurality of slats 52 in a closed position may be beneficial during a refueling operation because it will be easier to move fuel rods through the chimney partitions 20-1 to 20-N when the plurality of slats 52 are in a closed position. When the plurality of slats 52 are in a closed position, the plurality of slats 52 do not divide the space between two adjacent chimney partitions into smaller sections.

Alternatively, the plurality of slats 52 may be attached to the inside surface of the outer chimney partition among the two adjacent chimney partitions. The plurality of slats 52 may be attached to the insider surface of the outer chimney partition among two adjacent chimney partitions using a hinge structure H. Because of the hinge structure H, the plurality of slats may be configured to be positioned toward the inner chimney partition among the two adjacent chimney partitions in order to divide the space between the two adjacent chimney partitions into smaller sections, and the plurality of slats may be configured to be positioned against the inner surface of the outer chimney partition among the two adjacent chimney partitions in order to avoid dividing the space between the two adjacent chimney partitions into smaller sections.

The plurality of slats 52 may be made from a metal and/or metal alloy. For example, the plurality of slats 52 may be made from SAE 304 or SAE 316 stainless steel. However, example embodiments are not limited thereto Even though FIG. 5C illustrates an example where the plurality of slats 52 are only between the chimney partitions 20-3 and 20-N, example embodiments are not limited thereto. The plurality of slats 52 may alternatively positioned between the chimney partitions 20-1 and 20-2 and/or between the chimney partitions 20-2 and 20-3. According to an example embodiment, a chimney structure may include a first plurality of slats between the chimney partitions 20-1 and 20-2, a second plurality of slats between the chimney partitions 20-2 and 20-3, and a third plurality of slats between the chimney partitions 20-3 and 20-N.

Although FIG. 5C illustrates a chimney structure 501 including four chimney partitions 20-1 to 20-N having a common center, example embodiments are not limited thereto. The chimney partitions 20-1 to 20-N may include 2nd to (N−1)th concentrically arranged between the chimney partitions 20-1 to 20-N in sequential order. For example, the number of chimney partitions 20-1 to 20-N may be an integer greater than or equal to 4 and less than or equal to 12. However, number of chimney partitions 20-1 to 20-N may vary depending on the application is not limited thereto.

Figure 6:
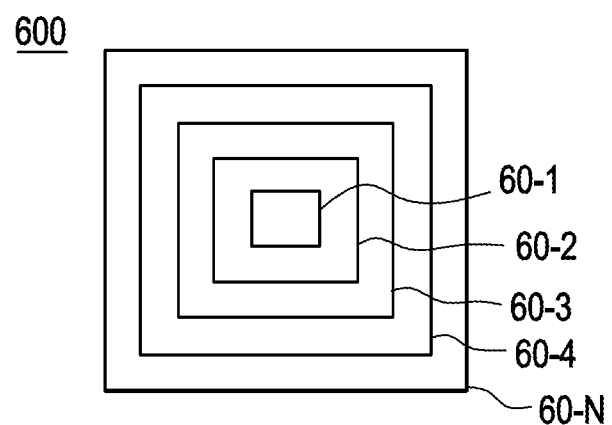
FIG. 6 illustrates a chimney structure according to an example embodiment.
Figure 6:
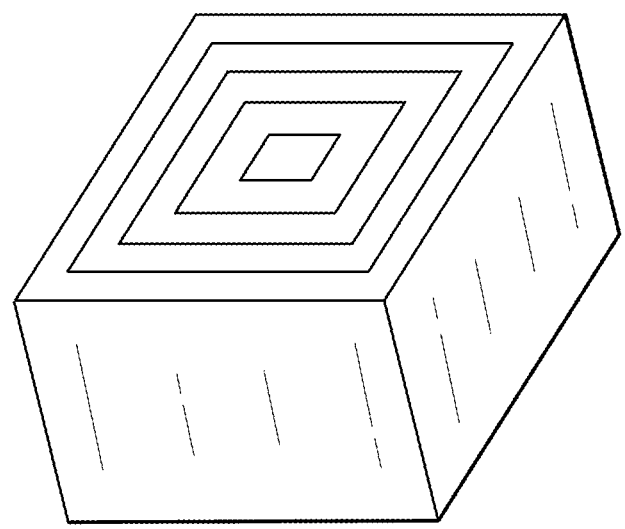

FIG. 6 illustrates a chimney structure according to an example embodiment.

Referring to FIG. 6, according to an example embodiment, a chimney structure 600 may include a plurality of chimney partitions 60-1 to 60-N having a common center. The chimney partitions may be positioned on a guide structure (not shown) with grooves corresponding to the peripheries of the chimney partitions 60-1 to 60-N. Each one of the chimney partitions 60-1 to 60-N may define an opening having a polygonal cross-section (e.g., a square, rectangle, octagon). The guide structure supporting the chimney structure 600 may also define an opening allowing fluid to flow through. When parts of the chimney partitions 60-1 to 60-N are positioned in the grooves of the guide structure, the openings of the chimney partitions 60-1 to 60-N may be arranged over the opening defined by the guide structure.

Figure 7:
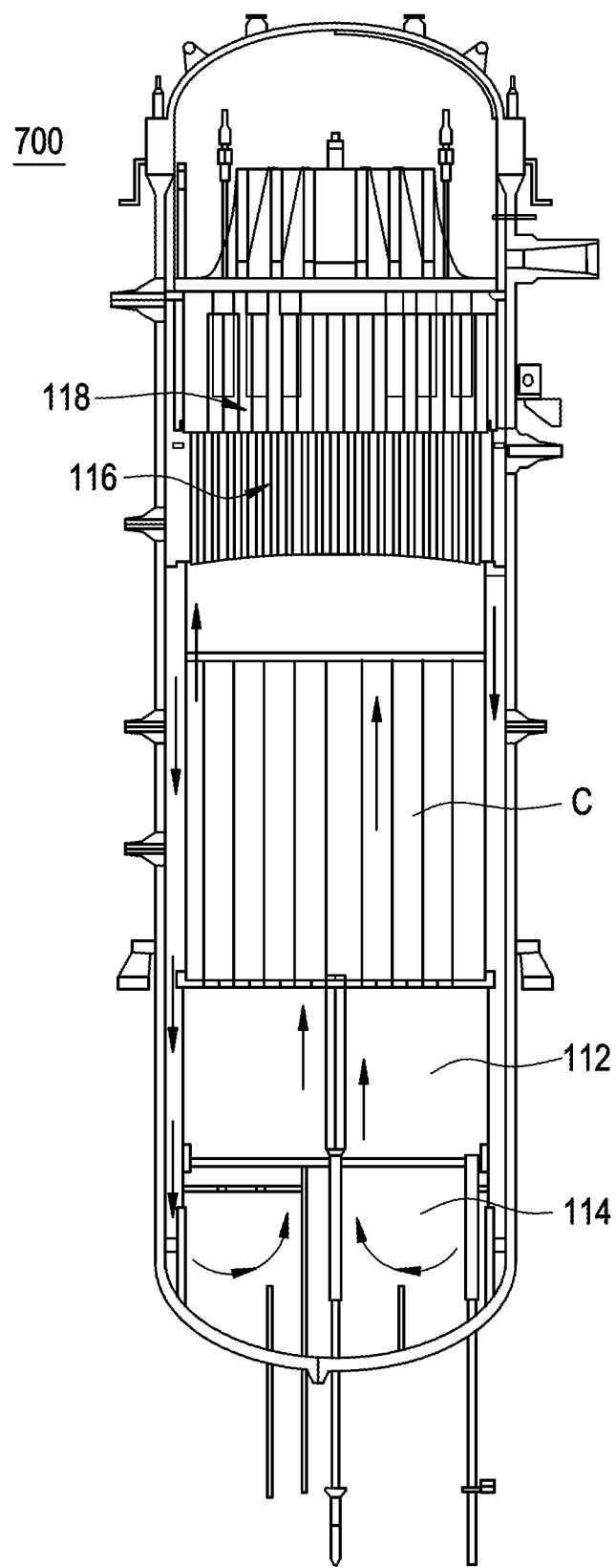
FIG. 7 illustrates a reactor including a chimney structure according to an example embodiment.

FIG. 7 illustrates a reactor including a chimney structure according to an example embodiment.

Referring to FIG. 7, according to an example embodiment, a reactor 700 includes a reactor core 112, a core inlet region 114, a chimney structure C secured to the reactor wall between reactor core 112 and a steam separator inlet region 116, and steam separators 118. The chimney structure C may be one of the above-described chimney structures according to example embodiments in FIGS. 1A, 1B, 2, 3E to 3H, 4A, 4B, 5A, 5B, and 6.

Descriptions and/or features in each of the above-described chimney structures according to example embodiments should be considered as available in other chimney structures according to example embodiments.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A chimney structure comprising:
a guide structure defining an opening having a plurality of gaps; and
a plurality of chimney partitions including 1 to N chimney partitions concentrically arranged between the plurality of gaps and spaced apart from each other on the guide structure, the 1 to N chimney partitions each defining a curved opening over the opening of the guide structure for providing a fluid flow path therethrough, and N being an integer greater than 1.

2. The chimney structure of claim 1, wherein
the 1 to N chimney partitions each have a tubular shape, and
the 1 to N chimney partitions have different radii.

3. The chimney structure of claim 1, wherein each one of the 1 to N chimney partitions is spaced apart from an adjacent one of the 1 to N chimney partitions by a same distance.

4. The chimney structure of claim 3, wherein a value of the same distance is configured to reduce the formation of Eddy currents if a steam mixture flows through the 1 to N chimney partitions.

5. The chimney structure of claim 1, wherein
an upper surface of the guide structure defines M grooves spaced apart from each other,
M is an integer greater than or equal to N,
parts of the 1 to N chimney partitions are in the M grooves defined by the upper surface of the guide structure.

6. The chimney structure of claim 1, further comprising:
a top plate on the 1 to N chimney partitions, wherein
the top plate defines an opening over the curved openings of the 1 to N chimney partitions.

7. The chimney structure of claim 1, further comprising:
a plurality of slats between two adjacent chimney partitions among the 1 to N chimney partitions, wherein the plurality of slats are configured to divide a space between the two adjacent chimney partitions into smaller sections.

8. The chimney structure of claim 7, wherein
the plurality of slats are attached to an inner surface of an outer chimney partition among the two adjacent chimney partitions,
the plurality of slats are configured to be positioned toward the inner chimney partition among the two adjacent chimney partitions in order to divide the space between the two adjacent chimney partitions into smaller sections, and
the plurality of slats are configured to be positioned against an inner surface of the outer chimney partition among the two adjacent chimney partitions in order to avoid dividing the space between the two adjacent chimney partitions into smaller sections.

9. The chimney structure of claim 7, wherein
the plurality of slats are attached to the inner chimney partition among the two adjacent chimney partitions,
the plurality of slats are configured to be positioned toward the outer chimney partition among the two adjacent chimney partitions in order to divide the space between the two adjacent chimney partitions into smaller sections, and
the plurality of slats are configured to be positioned against the inner chimney partition among the two adjacent chimney partitions in order to avoid dividing the space between the two adjacent chimney partitions into smaller sections.

10. The chimney structure of claim 1, wherein
the 1 to N chimney partitions each have a tubular shape, and
each one of the 1 to N chimney partitions is spaced part from an adjacent one of the 1 to N chimney partitions by a distance that is about equal to an inner diameter of the 1st chimney partition among the 1 to N chimney partitions.

11. The chimney structure of claim 10, wherein
the inner diameter of the 1st chimney partition is about 16 inches,
a diameter of the Nth chimney partition is about 30 feet,
a height of the 1 to N chimney partitions ranges from about 18 to 22 feet along an axial direction of the 1 to N chimney partitions, and
N is greater than or equal to 4 and less than or equal to about 12.

12. The chimney structure of claim 1, wherein
the 1 to N chimney partitions include 2nd to (N−1)th chimney partitions between the 1st and the Nth chimney partitions in sequential order,
the 1 to N chimney partitions each have a tubular shape,
the 1 to N chimney partitions have different radii, and
a separation distance between the 1st chimney partition and the 2nd chimney partition is different than a separation distance between two adjacent chimney partitions among the 2nd to (N−1)th chimney partitions.

13. The chimney structure of claim 1, wherein
the 1 to N chimney partitions include steel, and
a thickness of 1 to N the chimney partitions ranges from about 0.25 inches to about 0.50 inches.

14. A reactor comprising:
a reactor wall; and
the chimney structure of claim 1 secured to the reactor wall.

15. A chimney structure comprising:
a tubular chimney housing having an input opening and an output opening sharing a central axis with the input opening and defining a fluid flow path therethrough; and
a tubular partition arranged in and spaced from the tubular chimney housing to provide a central fluid flow path through the tubular partition and a first annular fluid flow path through an annular spacing defined by the tubular chimney housing and the tubular partition;
wherein the chimney structure is configured to permit a fluid to flow from an input end to an output end of the tubular chimney housing through both the central fluid flow path and the first annular fluid flow path.

16. A method of manufacturing a chimney structure, comprising:
concentrically arranging a plurality of chimney partitions on a guide structure, the guide structure defining an opening having a plurality of gaps,
the plurality of chimney partitions including 1 to N chimney partitions concentrically arranged between the plurality of gaps and spaced apart from each other on the guide structure,
the 1 to N chimney partitions each defining a curved opening over the opening of the guide structure for providing a fluid flow path therethrough,
N being an integer greater than 1.

17. The chimney structure of claim 15, wherein
the tubular partition defines an opening that has a polygonal cross-section, and
the tubular chimney housing has a polygonal cross-section.

18. A chimney structure comprising:
a guide structure defining an opening;
a plurality of chimney partitions including 1 to N chimney partitions concentrically arranged and spaced apart from each other on the guide structure, the 1 to N chimney partitions each defining a curved opening over the opening of the guide structure, and N being an integer greater than 1; and one of
at least one rod secured to the guide structure,
a plurality of divider plates extending through the 1 to N chimney partitions, the divider plates and the 1 to N chimney partitions defining a plurality of curved opening sections, based on sectionally dividing the curved openings of the 1 to N chimney partitions, and
a partition structure surrounding the 1 to N chimney partitions, an inner surface of the partition structure defining a round opening, the partition structure including divider plates that divide the round opening into round opening sections, the 1 to N chimney partitions each having a tubular shape, and the 1 to N chimney partitions having different radii.

19. The chimney structure of claim 18, wherein the chimney structure includes the: at least one rod secured to the guide structure.

20. The chimney structure of claim 18, wherein the chimney structure includes the plurality of divider plates extending through the 1 to N chimney partitions, the divider plates and the 1 to N chimney partitions define the plurality of curved opening sections, based on sectionally dividing the curved openings of the 1 to N chimney partitions.

21. The chimney structure of claim 18, wherein the chimney structure includes the partition structure surrounding the 1 to N chimney partitions, the inner surface of the partition structure defines the round opening, the partition structure includes divider plates that divide the round opening into round opening sections, the 1 to N chimney partitions each have the tubular shape, and the 1 to N chimney partitions have different radii.

22. The chimney structure of claim 21, wherein the divider plates are metal sheets, the divider plates include notches corresponding to the 1 to N chimney partitions, and the 1 to N chimney partitions are in the notches of the divider plates.

* * * * *